US008873491B2

(12) United States Patent
Chou

(10) Patent No.: US 8,873,491 B2
(45) Date of Patent: Oct. 28, 2014

(54) METHOD FOR DATA TRANSMISSION AND BASE STATION AND USER EQUIPMENT USING THE SAME

(75) Inventor: Chie-Ming Chou, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 174 days.

(21) Appl. No.: 13/568,150

(22) Filed: Aug. 7, 2012

(65) Prior Publication Data

US 2013/0039295 A1    Feb. 14, 2013

Related U.S. Application Data

(60) Provisional application No. 61/522,050, filed on Aug. 10, 2011.

(51) Int. Cl.
*H04W 4/00* (2009.01)

(52) U.S. Cl.
CPC .................................. *H04W 75/042* (2013.01)
USPC .......................................................... 370/329

(58) Field of Classification Search
USPC .......................................................... 370/329
See application file for complete search history.

(56) References Cited

U.S. PATENT DOCUMENTS

| 7,848,346 | B2 | 12/2010 | Park et al. |
| 8,005,039 | B2 | 8/2011 | Kamuf et al. |
| 2008/0045272 | A1* | 2/2008 | Wang et al. ................... 455/561 |
| 2009/0042558 | A1* | 2/2009 | Shen et al. ................. 455/422.1 |
| 2009/0168683 | A1* | 7/2009 | Franceschini et al. ........ 370/312 |
| 2009/0279500 | A1 | 11/2009 | Luo et al. |
| 2010/0120442 | A1 | 5/2010 | Zhuang et al. |
| 2010/0195629 | A1 | 8/2010 | Chen et al. |
| 2010/0226325 | A1 | 9/2010 | Chun et al. |
| 2011/0128896 | A1 | 6/2011 | Huang et al. |
| 2011/0149774 | A1 | 6/2011 | Chen et al. |
| 2011/0199985 | A1* | 8/2011 | Cai et al. ....................... 370/329 |
| 2011/0269442 | A1 | 11/2011 | Han et al. |
| 2011/0274066 | A1 | 11/2011 | Tee et al. |
| 2011/0310830 | A1* | 12/2011 | Wu et al. ....................... 370/329 |

(Continued)

FOREIGN PATENT DOCUMENTS

TW           201210239         3/2012

OTHER PUBLICATIONS

Vinay Majjigi, et al., "Persistent Resource Allocation in OFDMA Networks for Real-Time and Non-Real Time Traffic," Conference Record of the Forty-First Asilomar Conference on Signals, Systems and Computers, Nov. 4-7, 2007, pp. 280-284.

(Continued)

*Primary Examiner* — Kenny Lin
(74) *Attorney, Agent, or Firm* — Jianq Chyun IP Office

(57) ABSTRACT

A method for data transmission, a base station using the same and a user equipment (UE) using the same are proposed. The exemplary embodiments in accordance with the present disclosure implicitly allocate resources with overbooking by configuring M UEs to transmit or receive N protocol data units (PDU) where M>N. The overbooking is accomplished by using a base station to configure Small Data Sub-frame (SDS) for a plurality of UEs and request to process the SDS by sending a radio control message. The UEs would receive from the base station a sub-frame of data with multiple PDUs and perform processing on the PDUs to obtain a belonging data packet according to a candidate packet set and a search order previously embedded in the control message.

31 Claims, 7 Drawing Sheets

(56) References Cited

U.S. PATENT DOCUMENTS

| | | |
|---|---|---|
| 2012/0039264 A1 | 2/2012 | Kim et al. |
| 2012/0263117 A1* | 10/2012 | Love et al. ............ 370/329 |
| 2013/0003569 A1* | 1/2013 | Lindoff et al. ............ 370/252 |

OTHER PUBLICATIONS

Shweta Shrivastava, et al., "Group Scheduling for Improving VoIP Capacity in IEEE 802.16e Networks," IEEE, Vehicular Technology Conference, Apr. 26-29, 2009, pp. 1-5.

Haiming Wang, et al., "A Novel Bidirectional Resource Allocation to Decrease Signaling for Retransmission in LTE System," IEEE, Vehicular Technology Conference, May 11-14, 2008, pp. 2269-2271.

Renesas Mobile Europe Ltd "E-PDCCH design aspects," 3GPP TSG-RAN WG1 Meeting 66bis, Oct. 11-14, 2011, pp. 1-6.

Panasonic, "Considerations on Enhanced PDCCH," 3GPP TSG RAN WG1 Meeting 66bis, Oct. 11-14, 2011, pp. 1-3.

"Office Action of Taiwan Counterpart Application", issued on Jun. 24, 2014, p. 1-p. 4.

* cited by examiner

METHOD FOR DATA TRANSMISSION AND BASE STATION AND USER EQUIPMENT USING THE SAME

CROSS-REFERENCE TO RELATED APPLICATION

This application claims the priority benefit of U.S. provisional application Ser. No. 61/522,050, filed on Aug. 10, 2011. The entirety of the above-mentioned patent application is hereby incorporated by reference herein and made a part of this specification.

TECHNICAL FIELD

The present disclosure generally relates to a method for data transmission, a base station using the same and a user equipment (UE) using the same.

BACKGROUND

In current wireless broadband standards such as Third Generation Partnership Project Long Term Evolution (3GPP LTE), the control channel capacity usually is highly limited. Specifically, there may be about 10 Physical Downlink Control Channel (PDCCH) signaling which can be sent in one Transmission Time Interval (TTI) in a 10 MHz system bandwidth scenario, in which about at most 10 User Equipments (UEs) can be scheduled for either Downlink (DL) or Uplink (UL) data transmission. While dedicated UEs need to follow scheduling information carried by PDCCH, in fact a large proportion of Control Channel Elements (CCEs) has to be used for non-dedicated/common functions. For instance, about a total of 41 CCEs is available when 3 OFDM symbols are allocated for PDCCH, but out of the 41 available CCEs, up to 16 Control Channel Elements (CCEs) are commonly allocated for Common Search Space (CSS) including control functionalities such as System Information (SI), Paging, Random Access (RA), Transmission Power Control (TPC), and so like. This leaves only about 25 CCEs available for dedicated UE scheduling. For another example, in a scenario where 2 OFDM symbols are allocated for PDCCH, only about 10 CCEs out of a total of 25 CCEs are available for dedicated UE scheduling.

However, the channel capacity is further limited under the circumstance of Carrier Aggregation (CA). In Carrier Aggregation (CA), cross-carrier scheduling may be used to schedule resources on another serving cell and therefore reduce inter-cell interference in Heterogeneous Networks. In addition, cross carrier scheduling may be used to schedule resources on non-backward compatible carriers. For instance, when a wireless communication system is operating with extension carriers, during a sub-frame in which the allocated frequency band for a first carrier (CC1) may contain data in the Physical Downlink Shared Channel (PDSCH) and a second carrier (CC2) may contain data in its PDSCH, the control region of a first carrier (CC1) may actually contain PDCCH for both CC1 and CC2 while no PDCCH or Physical Hybrid ARQ Indicator Channel (PHICH) or Physical Control Format Indicator Channel (PCFICH) would exist in the control region of CC2 in order to avoid interference to control region of other cells. For another example of non-backward compatible carriers, the control region for the single carrier may contain control signaling for both backward and non-backward compatible PDSCH regions, while the control region for a neighboring PDSCH is suppressed in order to avoid interference to control regions of other cells. This means that using carrier aggregation would further limit control channel capacity.

In a practical scenario, for example, the applications of instant communications (e.g. messages services and social networks) have long packet inter-arrival time while intermittent transmission of small amounts of data is used. In additional, the time of arrivals between packets may be large. If a scheme of periodic resource allocation is adopted, it would result in a waste of resource allocation if the scheduled period were short but would otherwise adversely affect interactivity if the period were long. For real time services such as gaming, video surveillance, remote control, and so like, tight delay and frequency transmissions of small amounts of data having variable sizes. Also for machine type of communication in general, such as machine-to-machine traffic, a large amount of small data traffic with variable sizes is required. Therefore, all that has been described necessitate a need for a mechanism to reduce the control signal (e.g. PDCCH) overhead.

Semi-Persistent Scheduling (SPS) could be used to reduce the control signal overhead. For services involving a semi-static packet rate such as VoIP, SPS can be configured to reduce the control signal overhead. For this kind of service to be implemented, the timing and the amount of radio resources require predictability. The SPS enables radio resources to be semi-statically configured and allocated to a UE for a longer time period than one sub-frame, and the SPS may avoid the need for transmitting specific downlink assignment messages or uplink grant messages over the PDCCH for each sub-frame. However, the SPS may not be suitable for other Internet applications such as social network applications since updating information on the social network website could not be easily predicted.

SUMMARY

The present disclosure is directed to a method for data transmission, a base station using the same and a user equipment (UE) using the same. According to an exemplary embodiment, the present disclosure provides a method of receiving a control message in a first sub-frame from a base station to process a second sub-frame followed by a control message, receiving from the base station a second sub-frame of data, decoding the second sub-frame of data according to the control message; and obtaining a belonging data packet from the decoded sub-frame according to a candidate packet set and a search order.

According to an exemplary embodiment, the present disclosure provides a user equipment which has a transceiver and a processor. The transceiver transmits and receives wireless signals. The processor is configured to receive a control message in a first sub-frame from a base station to process a second sub-frame followed by a control message, receive from the base station a second sub-frame of data, decode the second sub-frame of data according to the control message; and obtain a belonging data packet from the decoded sub-frame according to a candidate packet set and a search order.

According to an exemplary embodiment, the present disclosure provides a base station which contains a transceiver and a processor. The transceiver transmits and receives wireless signals. The processor is configured to transmit through the transceiver a control message to the at least one UE in a first sub-frame to request each UE to receive a second sub-frame of data followed by a control message, encode the second sub-frame of data comprising the at least one data packet according to a plurality of candidate packet set and a plurality of search order; and transmit to the UE the encoded sub-frame of data.

The accompanying drawings are included to provide a further understanding of the disclosure and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
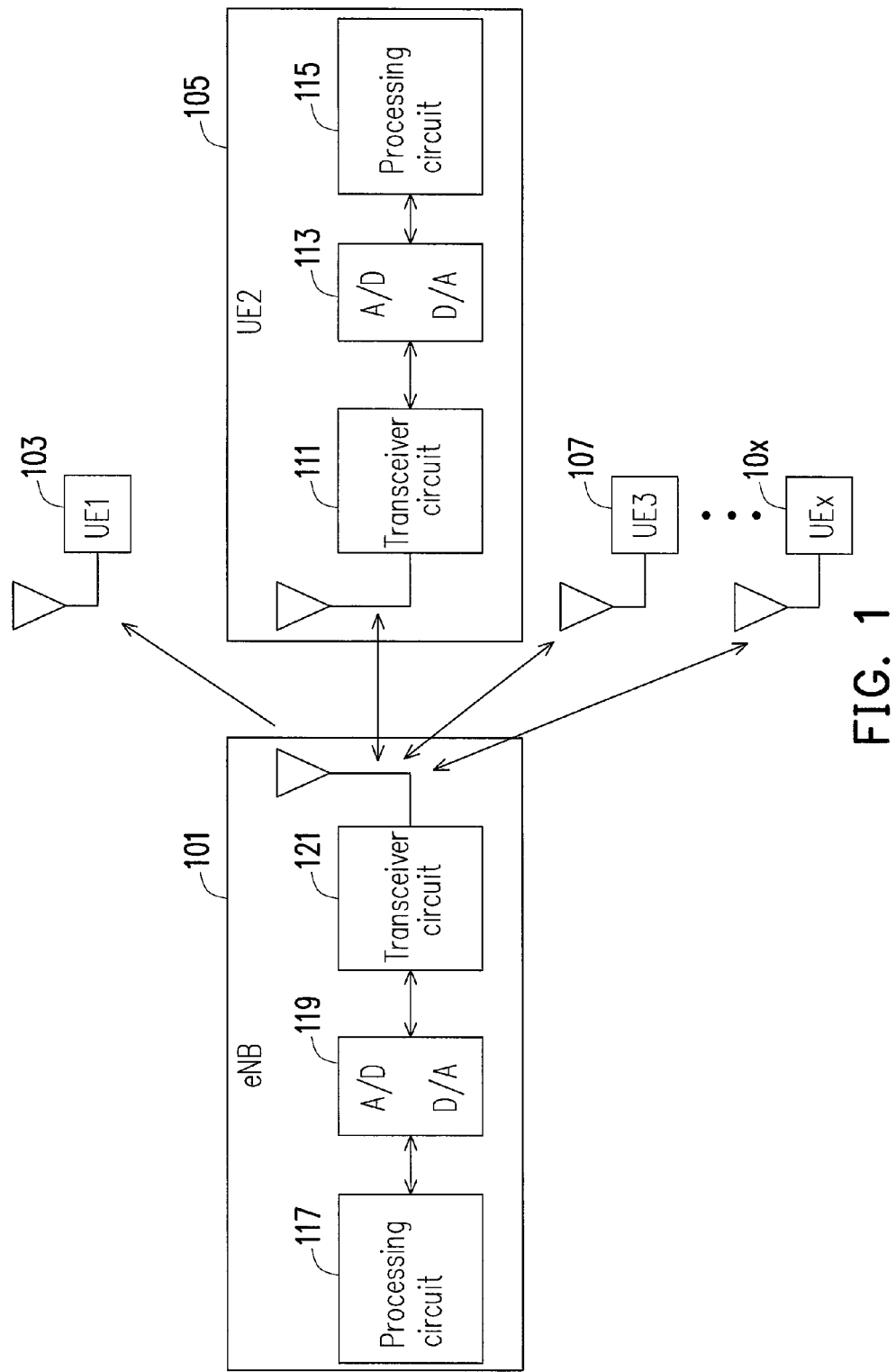
FIG. 1 illustrates a wireless communication system including an eNB communicating with at least one UE in accordance with an exemplary embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, sensor network and so like by persons of ordinarily skilled in the art.

Throughout the disclosure, the term PDCCH is used to represent the a control region or a downlink control channel to indicate downlink (DL)/uplink (UL) resource allocation assignment, the same concept by the present disclosure can also be applied to other downlink control channels including DL-MAP, UL-MAP, MBS-MAP, and so like through simple analogy.

The term "eNodeB" or its equivalent eNB in this disclosure may be, for example, a base station (BS), a Node-B, an advanced base station (ABS), a base transceiver system (BTS), an access point, a home base station, a relay station, a scatterer, a repeater, an intermediate node, an intermediary, and/or satellite-based communication base stations, remote radio header (RRH) and so like.

The term "user equipment" (UE) in this disclosure may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, a smart-phone and so like. In some applications, a UE may be a fixed computer device operating in a mobile environment, such as a bus, train, an airplane, a boat, a car, and so like.

Presently, with the applications using small data packets with diverse data sizes are on the rise, the control region in a sub-frame carrying control information may require more space in order to accommodate the increase of the control signaling space. However, since the PDCCH capacity in the control region is highly limited, there is a need to either reduce the PDCCH overhead or to increase the control region. In this present disclosure, a method for data transmission and a base station and a user equipment using the same method are proposed to enhance the data transmission by overbooking resource allocation under Small Data Sub-frame (SDS).

FIG. 1 illustrates a wireless communication system according to an exemplary embodiment. The wireless communication system includes an eNodeB (101) in communication with at least one UEs (103, 105, ..., 10x) in accordance with a wireless communication standard. Each UE contains, for example, at least a transceiver circuit (111), an analog to digital (A/D)/digital to analog (D/A) converter (113), and a processing circuitry (115). The transceiver circuitry (111) is configured for transmitting uplink signal and/or receives downlink signal wirelessly. The transceiver circuitry (111) may also perform operations such as low noise amplifying, impedance matching, frequency mixing, up or down frequency conversion, filtering, amplifying, and so like. The transceiver circuitry (111) also includes an antenna unit (not shown in FIG. 1). The analog-to-digital (A/D)/digital-to-analog (D/C) converter (113) is configured to convert from analog signal format to digital signal format during downlink signal processing and digital signal to analog signal during uplink signal processing. The processing circuitry (115) is configured to process digital signal and to perform procedures of the proposed method for data transmission in accordance with exemplary embodiments of the present disclosure. Also, the processing circuitry (115) may include a memory unit (not shown in FIG. 1) to store data or record configurations assigned by the eNB 101. The eNB 101 contains similar elements including a transceiver (121), A/D, D/A (119), and a processor (117) which lead to the converted digital signal to be processed by its processing circuitry (117) so as to implement the method for data transmission in accordance with exemplary embodiments of the present disclosure.

Conventionally, a base station would configure an UE a kind of radio resource allocation for Semi-Persistent Scheduling (SPS) for downlink assignments and thereby eNB could transmit sub-frames of data to the UE without a region for control signaling. The configuration may indicate the dedicated allocation and interval while the UE would perform reception without additional control signaling in persistent way. However, since the demand for resource allocations might be bursty in nature, a user might suddenly demand a great amount of resources. Also, the number of active UEs is not constant but may fluctuate over time which may possibly cause a high demand for resource allocations in any instant. Furthermore, under a conventional method using the SPS, a base station would configure a resource allocation only dedicated for a single user. If the user is not scheduled to receive a lot of data, the regarding resource may be wasted as its media access unit protocol data units (MAC PDU) or PDU would contain empty data. Therefore, in the present disclosure, there is a proposed method for data transmission by overbooking at least one specific resource with more users sharing the data transmission than the number of partitions in the data transmission.

Instead of using the conventional SPS operation, sub-frames configured for Small Data Sub-frame (SDS) is proposed for data transmission between an eNB and a plurality of users (or UEs). A Small Data Sub-frame (SDS) is a sub-frame of resource configured for the SDS operation and is received according to given SDS parameters at the UEs.

Figure 2:
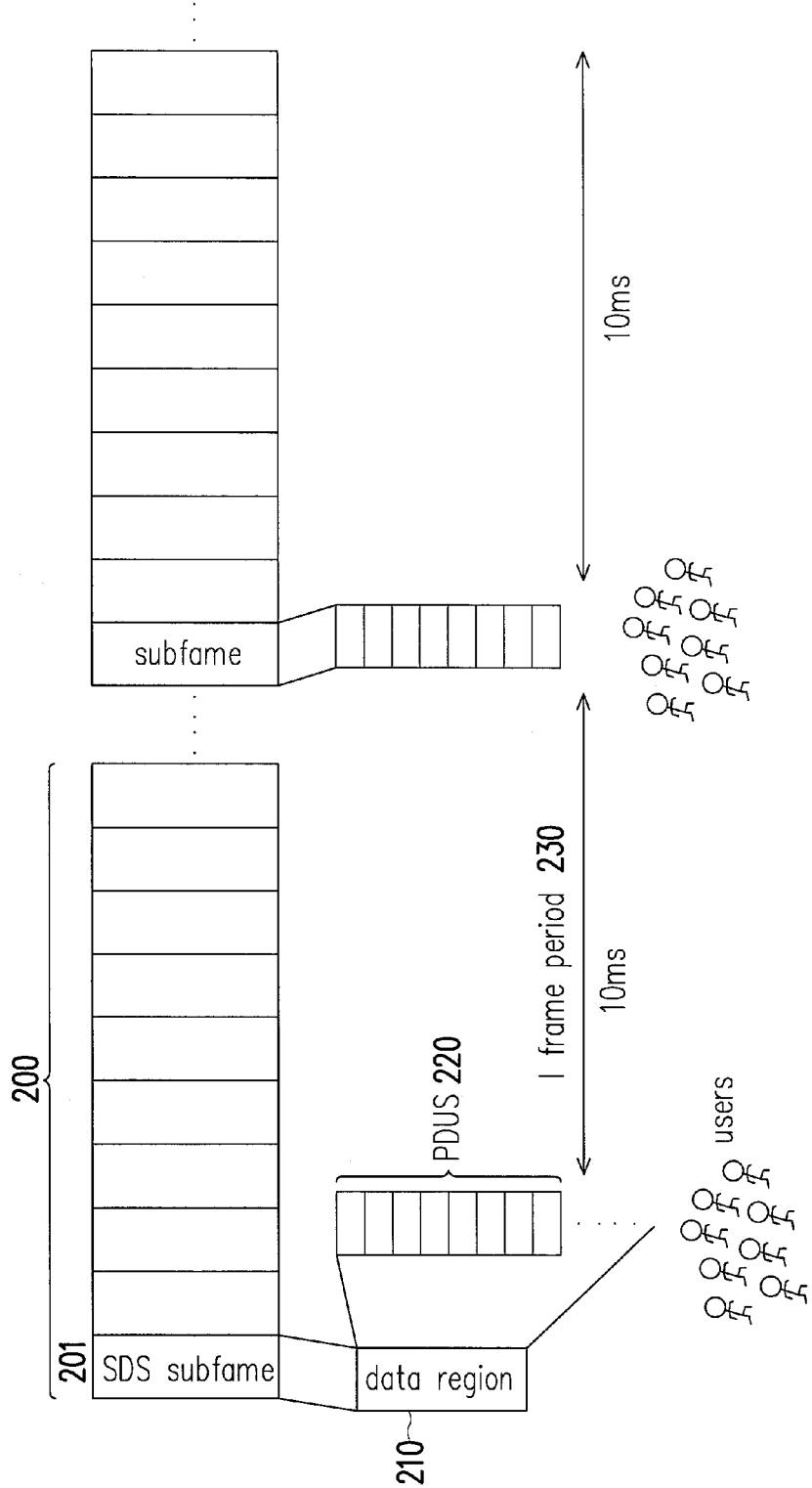
FIG. 2 illustrates sub-frames configured for Small Data Sub-frame (SDS) used in data transmission between an eNB and a user in accordance with an exemplary embodiment.

In an embodiment of the present disclosure, a SDS could be configured by an eNB for transmitting data without PDCCH. Though the SDS could be periodic, an eNB could configure multiple SDS by associating a different interval for each different UE. According to an exemplary embodiment illustrated by FIG. 2, there may be for instance 10 sub-frames (200) of data in a frame of data (230) with a period of 10 milliseconds. One of the sub-frame might be configured as a SDS and the period of SDS is generally fixed (20 ms in this example) until it is changed by a base station. Within each sub-frame of data (201), there would be usually a data region including multiple MAC PDUs (220) which carry control elements and payloads of data. However, there could be no control region for the SDS as no instruction is required to facilitate decoding data in SDS and each SDS is pre-configured by the base station through previously transmitted control message(s), such as radio resource control (RRC) message.

When an UE is configured with the SDS by a base station, it would decode the SDS and process the content according to SDS parameters. The SDS parameters may be assigned or provided by the base station to the UE through previously transmitted control message contained in a first sub-frame such as RRC message(s). SDS parameters might indicate the number of data packet in a SDS, the size of one data packet in the SDS, the modulation and coding scheme (MCS) for each data packet in the SDS, at least one corresponding hybrid automatic repeat request (HARQ) ID of the UE, at least one corresponding HARQ resources in a physical uplink control channel (PUCCH), a pre-assigned candidate packet set and a search order for the data packet, and a search algorithm for obtaining the candidate packet set.

For the proposed SDS, each PDU in the SDS may be configured with an equal size with the same MCS, and each SDS may contain a fixed number of PDUs. However, instead of allocating an entire SDS for only one user, a SDS could be shared by multiple users (we called an overbooking in SDS). Under the SDS, resources upon each PDU could be allocated for a different user. Overbooking means that multiple users could be configured to receive its data packet on the same resource. For example, when the number UE(s), M, could be larger than the number of PDUs, N, in a SDS sub-frame.

Figure 3:
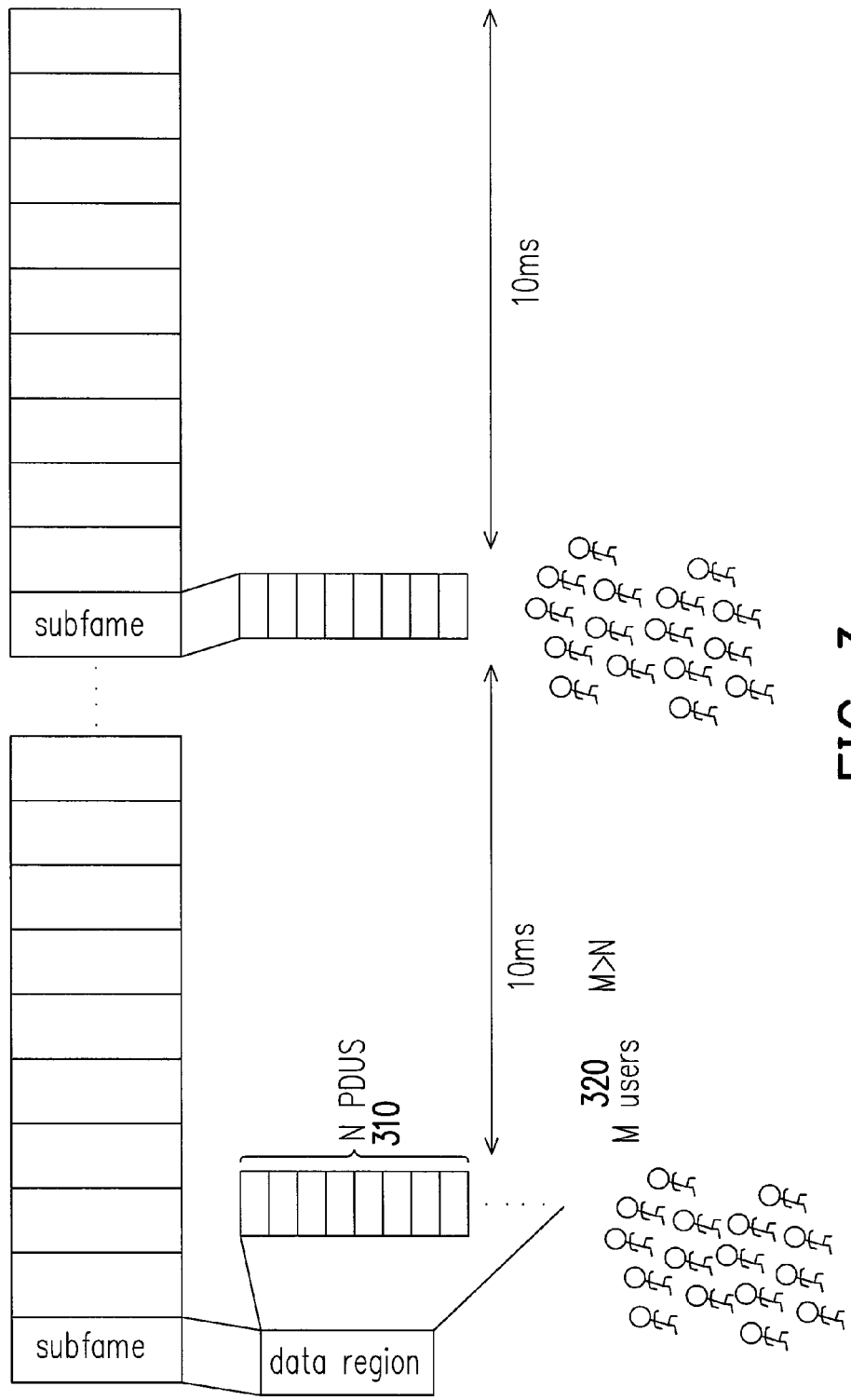
FIG. 3 is a schematic diagram illustrating a method of SDS operation with overbooking according to an exemplary embodiment.

Referring to FIG. 3 which illustrates the concept of overbooking a SDS sub-frame. Overbooking means that an eNB could configure M UEs (320) to receive N PDUs (310), where M>N. In other words, a SDS is overbooked when the number of UEs expecting to receive a SDS exceeds the number of PDUs in a SDS sub-frame. Under overbooking, each of the M UEs would decode its candidate packet set following the search order. If an UEs does not find a belonged content from a SDS, it could means that there are too many users demanding resource allocation in an instant and resources upon the candidate packet set are allocated for other UEs'. However, the UE would continuously try to receive downlink data in next and future SDS until receiving a change command from the eNB. The details of the SDS with overbooking are described as follows.

Figure 4:
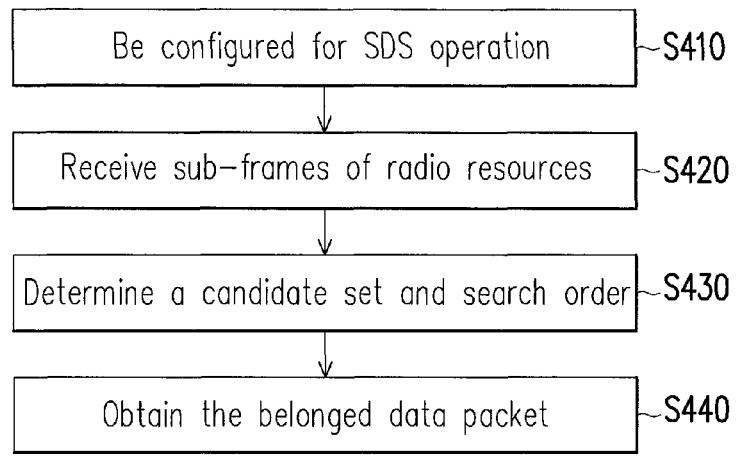
FIG. 4 is a process flow chart illustrating a method of SDS operation with overbooking from an UE's point of view according to an exemplary embodiment.
Figure 5:
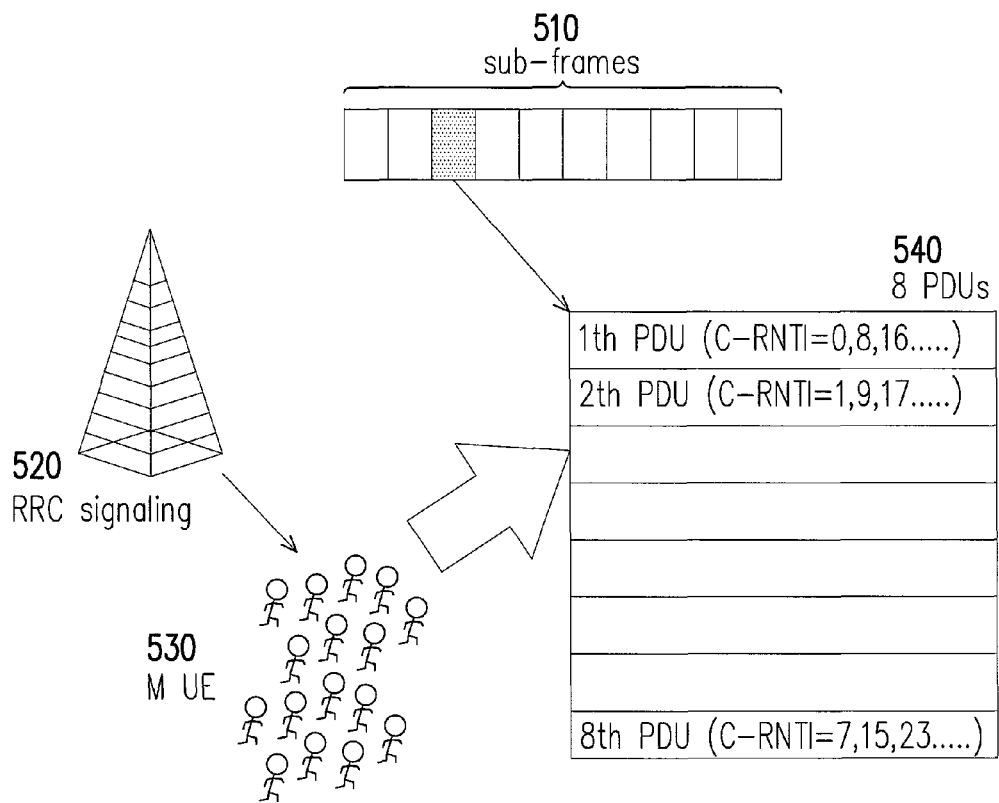
FIG. 5 illustrates overbooking between an eNB and a plurality of users according to an exemplary embodiment.

FIG. 4 is a process flow chart illustrating the overall method of SDS with overbooking from an UE's point of view according to an exemplary embodiment. FIG. 5 illustrates overbooking under SDS between a base station and M users. Referring to FIG. 4 and FIG. 5 together, in step S410, a base station (520) may initiate SDS by sending a selected group of UEs (530) a request message to receive SDS. The request message maybe a RRC message such as a RRCconnectionReconfiguration message. The RRC message is a separate and different message which may be transmitted on a normal sub-frame (include allocation of resources and downlink assignments). The RRC message would include SDS parameters mentioned previously.

After executing step S410, step S420 would be executed so as to receive a second sub-frame after receiving the RRC message. Note that the second sub-frame does not necessary follow right after the first sub-frame immediate but there may be numerous sub-frames in between. The SDS may be, upon reception, ignored by other normal UEs not configured for SDS. To support this feature, an eNB may from within the sub-frames (510) set SDS sub-frame as an MBSFN sub-frame. UEs could know which sub-frame was set as MBSFN from eNB's system information and would not receive that sub-frame during its operations. Otherwise, a normal UE would still receive every sub-frame and decode the PDCCH from each sub-frame to understand whether the sub-frame contains data which belongs to the UE. If it does, then the UE would decode the PDSCH of the sub-frame to obtain its packet data or PDU.

However, when a sub-frame is configured by an eNB as SDS, only UEs received configuration from the eNB as SDS UEs would receive SDS. Also, an UE configured for SDS does not only receive SDS but can still receive other normal non-SDS sub-frames as well.

Upon receiving a SDS, an UE configured for SDS would decode the SDS in order to obtain PDUs (540). However, not all PDUs in a SDS are designated for the UE since a SDS is shared by multiple users (530). The UE is required to obtain its belonged PDU or PDUs which is designated by the base station specifically for the UE.

Next in step S430, upon receiving the PDUs, the UE would then need to determine a candidate packet set and a search order. Take the scenario in FIG. 5 as an example, FIG. 5 shows a SDS (540) to be transmitted to a group of 16 UEs (530), and the SDS contains 8 PDUs (540). However, a UE might not search all PDUs. The UE may only need to search a candidate set of 3 PDUS with a specific order such as $\{0 \rightarrow 2 \rightarrow 4\}$ for UE #1 and $\{1 \rightarrow 3 \rightarrow 4\}$ for UE#2. Since the candidate set of the search list is less than the total number of PDUs in a SDS, data processing efficiency can be enhanced. The candidate packet set and the search order could be determined by implicit indications or by explicitly configured RRC control message.

A UE may have multiple candidates PDU allocations in a SDS and will check the sub-frame with one kind of candidate packet set and a search order after they have been determined. A base station may encode a PDU in a candidate pack set with a CRC code, each PDU from the candidate packet set is checked by a cyclic redundancy check (CRC check) to determine whether the PDU is designated to the UE or whether the PDU belongs to other UEs. Since multiple PDUs in a SDS may be granted to the same UE by the base station, an UE may need to check the entire candidate packet set in order to find the belonged PDUs. Alternatively, if only one PDU may be designated for an UE, the UE may stop performing the CRC check once it has found a belonged PDU. Whether only one PDU be designated for a UE or multiple PDUS may be designed for a UE can be configured by the RRC control message.

The candidate packet set and the search order may be obtained based on the identification of a UE and the SDS parameters. For the step S430, four specific embodiments are proposed for the approach to determine a candidate set and a search order.

In an exemplary embodiment, the aforementioned identification of a UE may be a C-RNTI parameter of the UE. The C-RNTI parameter is an identifier assigned to a UE by a base station in order to authenticate active UEs' transmission. An identifier for a UE may also be the T-SMTI parameter or the MAC address of a UE. A PDCCH is always scrambled with C-RNTI to facilitate an UE to understand that a regarding data allocation is for its use. A hash function operated with an equipment identifier such as the C-RNTI, T-SMTI, or MAC address and the number of radio resources such as the number of PDU in SDS is used to calculate the candidate set and the search order. The C-RNTI parameter can be expressed as a polynomial where the root (N) is the number of PDUs as configured under SDS. For example, the C-RNTI may be expressed as equation (1):

$$C\text{-}RNTI = a \times (N) + b \quad \text{equation (1)}$$

In the equation (1), parameters a and b are coefficients of the polynomial and have to be greater or equal to zero. N is the number of PDU in a sub-frame. The coefficient b is the first PDU to be checked by the CRC to see if it is a belonged PDU. The specific polynomial used in the hash function maybe transmitted as part of the SDS parameter which indicates the specific algorithm to be used by the requested UE.

For example, referring to FIG. 5, equation 1 is used to determine which PDU would be checked by which UE with its pre-assigned C-RNTI number. The $1^{st}$ to $8^{th}$ PDU for this example are numbered 0 to 7. Since N=8, for C-RNTI numbered from 1 to 7, a in equation (1) has to be zero since a and b have to be greater than zero; and therefore, b equals respectively from 1 to 7. This means that an UE with C-RNTI number 1-7 are set to first check PDUs numbered from 1 to 7. Take C-RNTI number 15 for example, a in this case will equal to 1 and b equals to 7; and therefore, the $8^{th}$ PDU is checked first by C-RNTI number 15 first.

Other hash functions can be applied to obtain a candidate set, and the hash function maybe communicated to selected UEs through SDS parameters in a RRC control message. For another example, an equation 2 shown below may be used for as part of an alternative search algorithm.

$$C\text{-}RNTI = a \times N^2 + b \times N + c \quad \text{equation (2)}$$

In the equation (2), where parameters a, b, c are integers greater than or equal to zero, and N is the number of data packet which is 8 in this example. If C-RNTI=114, then 114=1×8²+6×8+2 so that the candidate packet for that particular UE is {1, 6, 2}. A different UE would then have a different candidate packet since the C-RNTI number would be different.

Furthermore, in this example, the search list (or the candidate packet set) is explicitly transmitted from the base station 520 by the SDS parameter or could be implicitly derived from the hash function (it is noted that how to get the search list is also specified by SDS parameters). After obtaining the SDS parameters, the search order is determined to be c→b→a, and therefore, the search order in this example is 2→6→1. Under the first embodiment, an algorithm containing a hash function and a search order are used to obtain the total number of candidate PDUs so as to reduce the search requirement An UE can find its belonged data packet or PDU while processing only a sub-set of a total number of PDUs in a SDS.

For another exemplary embodiment, both the candidate packet set and search order for UEs selected under the SDS are pre-assigned. For example, a station may configure a RRC message to contain a SDS parameter which tells a UE that its candidate packet list and the search order are PDU #{3, 4, 7}, the UE would then perform a CRC check on PDU #3→PDU #4→PDU #7 to obtain its belonged PDU.

For another exemplary embodiment, the candidate packet set is the entire data packet in a SDS, and the search order is sequential. This means that the UE should sequentially check all the packets in a sub-frame configured for SDS according to a sequential search order. In this example, the candidate packet list and the sequential search order is 0→1→2→3→4→5→6→7.

For another exemplary embodiment, the candidate packet set is based on a cyclic sequence of the PDUs in a SDS, and the search sequence is pre-assigned. More specifically, in order to obtain the candidate packet set, the C-RNTI number is divided by N, which is the total number of PDUs under SDS. After the division, the remainder is mapped to a group of candidate packet set. For instance, the first group is {1, 2, 3}, the second group is {2, 3, 4}, and the third group is {3, 4, 5}, . . . , the eighth group is {8, 1, 2}, and so on and so forth. If C-RNTI is 114 and N=8, then after 114 divide by 8, the remainder R is 2. Since R=0 would map into the first group, R=1 would map into the second group, R=2 would map into the third group which is {3, 4, 5}. The search order is pre-assigned as specified by the SDS parameter, and for this example is 3→4→5.

After a candidate packet set and a search order is determined in the step S430, the configured UE receiving a SDS would perform step S440 to obtain the data packet(s) which is belonged to the UE by performing CRC checking for the data packets scheduled to be searched. The UE may trace all the candidate set and verify which one packet is belonged, or the UE may search the data packet by the search order and terminate the search if there is one matched according to embodiments 1-4. The criteria used for the CRC check would also be specified by the SDS parameters. Furthermore, the CRC may be masked with the C-RNTI to support the check.

Figure 6:
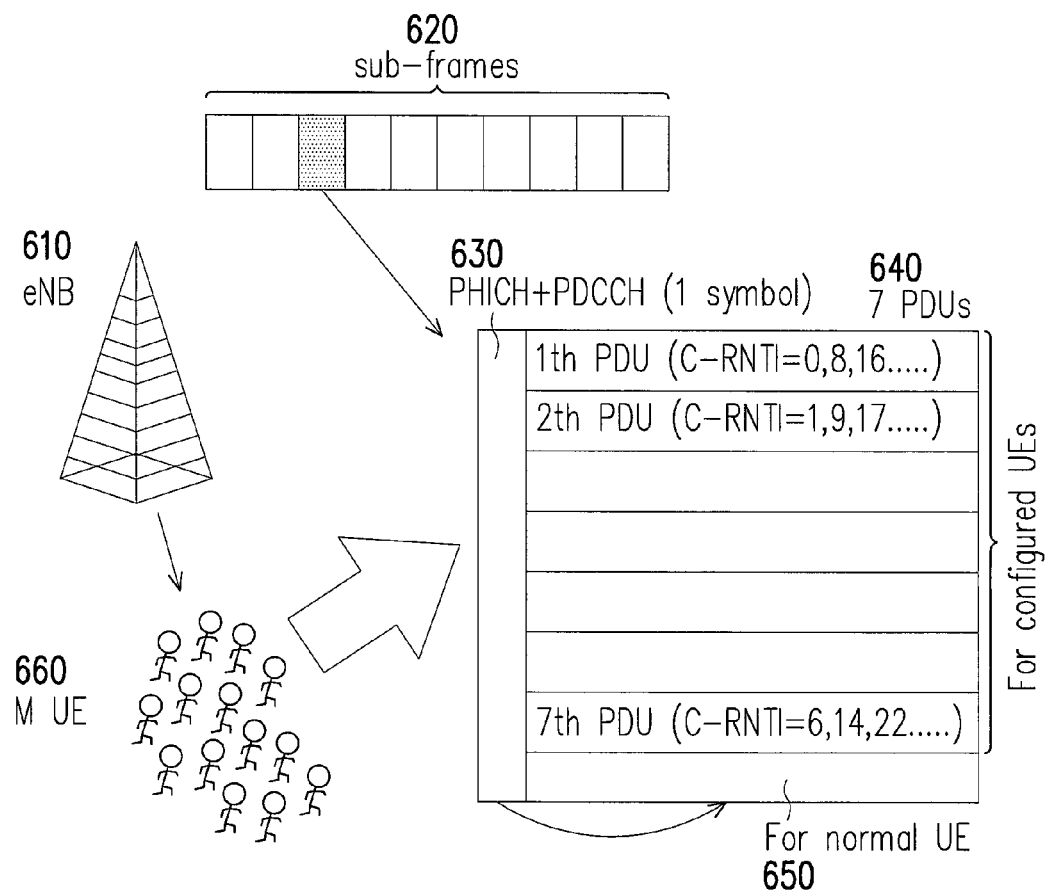
FIG. 6 is a schematic diagram illustrating a SDS operation for an UE according to an exemplary embodiment.

According to an exemplary embodiment, physical indication channel (PHICH) and minimal PDCCH can be used in conjunction with the SDS. An eNB may schedule data for other UEs in a region of a sub-frame by the conventional method, and the rest of the sub-frame are used for UEs under the SDS. This means the sub-frame is a hybrid of normal sub-frame and SDS. Referring to FIG. 6 as an example, FIG. 6 illustrates an eNB 610 transmitting downlink assignments in sub-frames 620 to a group of UEs 660. Within each sub-frame, there would be a control region 630 for PHICH+ PDCCH using one ODFM symbol and a data region with 8 PDUs (640, 650). The control region 630 would be used by a normal UE 650 which also shares a part of the data region, namely the $8^{th}$ PDU (650), with other UEs configured for the SDS operation. Meanwhile, PDUs number 1 to 7 are used by PDUs configured for SDS. The control region of the sub-frame with PHICH and PDCCH would be skipped when UEs configured for SDS and try to decode the sub-frame. In this way, UEs configured with the SDS would be compatible with UE configured with conventional scheduling method having a control region for PDCCH and PHICH so that overbooking can be applied with UE configured under SDS. For UE without configuring SDS, it will try to decode PDCCH first and then try to decode the resources region of $8^{th}$ PDU to get its allocation.

In Summary, according to FIG. 4, FIG. 5 and the explanations according to the exemplary embodiment, the present disclosure discloses a method of transmitting data for a user equipment (UE), the method contains the steps of receiving a control message in a first sub-frame from a base station to process a second sub-frame followed by a control message, receiving from the base station a second sub-frame of data, decoding the second sub-frame of data according to the control message, and obtaining a belonging data packet from the decoded sub-frame according to a candidate packet set and a search order. The present disclosure also discloses a user equipment which has a transceiver and a processor. The transceiver transmits and receives wireless signals. The processor is configured to receive a control message in a first sub-frame from a base station to process a second sub-frame followed by a control message, receive from the base station a second sub-frame of data, decode the second sub-frame of data according to the control message; and obtain a belonging data packet from the decoded sub-frame according to a candidate packet set and a search order.

Figure 7:
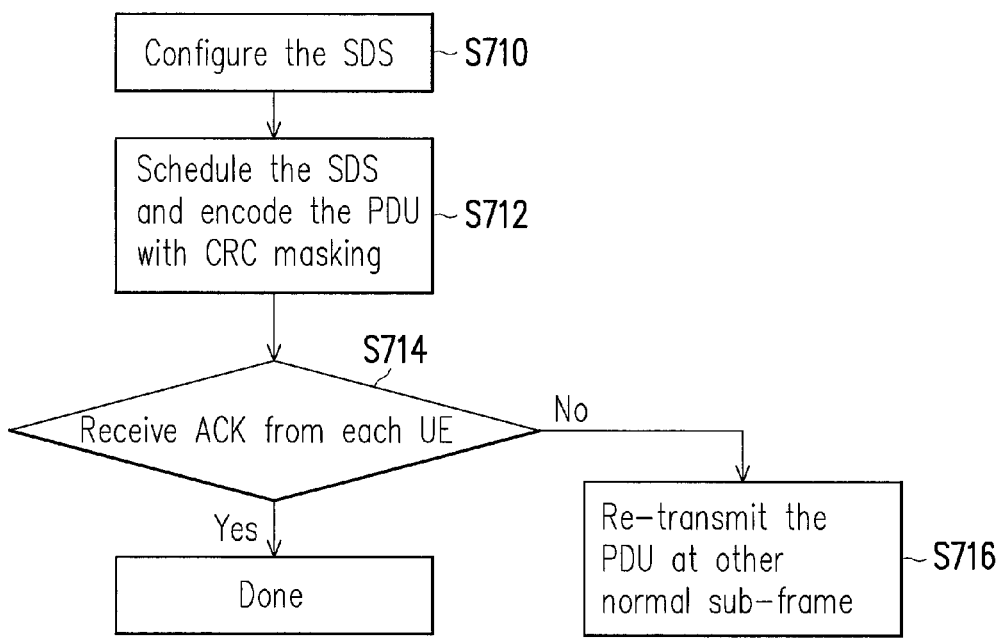
FIG. 7 is a process flow chart illustrating a SDS operation for an eNB according to an exemplary embodiment.

FIG. 7 is a process flow chart illustration the SDS with overbooking from an eNB's point of view. In step S710, an eNB configures a number of UEs for a SDS by sending them a control message, such as the RRC message. Next, in step 712, the eNB schedules a UE for SDS by designating one or more data packets to be received by a UE according to a candidate packet set and a search order which may be indicated in the control message; The PDU is to be encoded into the SDS with CRC masking.

Next, in step S714, the eNB determines whether an acknowledgement signal is received from each UE. If an ACK message is not received from each UE, in step S716, a re-transmission will be made with another conventional sub-frame. In the exemplary embodiment, the sub-frame configured for the SDS is transmitted for the initial transmission. The redundancy version of the data packet(s) for the re-transmission is transmitted with PDCCH+PDCCH under legacy rules in other legacy sub-frames. This means that dedicated ACK/NACK resource is used for each data packet(s) intended for each UE, and the PUCCH resource index can be assigned. There would be no sharing of a resource on downlink data re-transmission. HARQ process ID can be assigned automatically like SPS by the eNB. Each UE would receive a dedicated HARQ process ID for each intended data packet(s) in a SDS.

Figure 8:
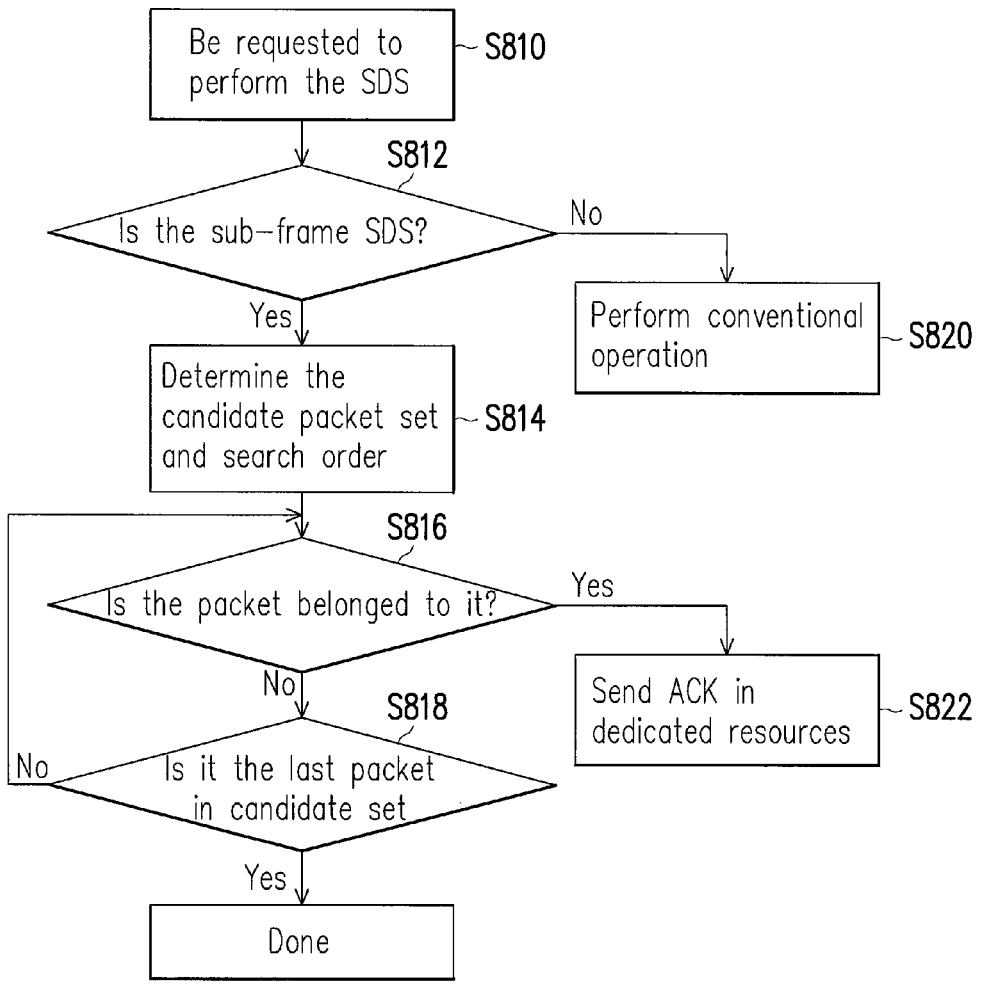
FIG. 8 illustrates a SDS operation in concert with conventional resource allocation method having control regions according to an exemplary embodiment.

FIG. 8 is a process flow chart illustrating the SDS with overbooking from an UE's point of view. In step S810, an UE receives a request from a base station to process the SDS through a control message such as a RRC message. In step S812, the UE determines whether a sub-frame is SDS. If it is not, then in step S820, the UE performs conventional operation with the received sub-frame. If yes, then in step S812, the UE determines a candidate packet set and a search order which can be determined by implicit indications or by an explicit configuration received through SDS parameters appended in a RRC signaling. In step S816, the UE decodes the SDS and determines its belonged PDU by using the candidate packet set and the search order, and the UE would performs a CRC check on each searched PDU to determine whether the PDU is a belonged PDU or not. If a belonged PDU is found, then in step S822, an ACK message is sent to the base station in dedicated ACK resources. If a belonged PDU is not found, then the UE does not send a NACK message according to the exemplary embodiment. If a belonged PDU is found in the step S816, then the UE determines whether the PDU is the last PDU in the candidate list in step S818. If not, the process continues to execute the step S816 until the entire candidate packet set is searched. The process of the SDS with overbooking is completed after the step S818. Alternatively, the UE may terminate the process once a belonged PDU is found.

For those UEs not under a request to operate in the SDS, an eNB may indicate the SDS as a multi-cast broadcast signal frequency network (MBSFN) and the UE may skip SDS sub-frames in order to avoid confusions.

According to FIGS. 7 and 8 and their corresponding written descriptions, it can be summarized that the present disclosure discloses a base station which contains a transceiver and a processor. The transceiver transmits and receives wireless signals. The processor is configured to transmit through the transceiver a control message to the at least one UE in a first sub-frame to request each UE to receive a second sub-frame of data followed by a control message, encode the second sub-frame of data comprising the at least one data packet according to a plurality of candidate packet set and a plurality of search order; and transmit to the UE the encoded sub-frame of data.

The aforementioned exemplary embodiments are able to improve data transmission by reducing the control signal overhead in the transmitted signals through a SDS with overbooking. Accordingly, the control signaling can be greatly eliminated when configuring a sub-frame under the SDS, and the overall control signaling space can be reduced when operating in conjunction with conventional sub-frames. Also, by sharing the sub-frame with a number of different users and by overbooking each sub-frame with more UEs than the number of PDUs, the overall system transmission efficiency can be greatly improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of transmitting data for a user equipment (UE), the method comprising:
    receiving a control message in a first sub-frame from a base station to process a second sub-frame followed by the control message;
    receiving from the base station a second sub-frame of data;
    decoding the second sub-frame of data according to the control message; and
    obtaining a belonging data packet from the decoded sub-frame according to a candidate packet set and a search order, wherein the step of obtaining the belonging data packet from the decoded sub-frame comprises:
    determining the candidate packet set and the search order based on the control message;
    searching the candidate packet set according to the search order; and
    obtaining the belonging data packet from the searched candidate packet set.

2. The method of claim 1, wherein the control message in the first sub-frame is a RRC message.

3. The method of claim 1, wherein the step of determining the candidate packet set and the search order comprises:
    performing a hash function based on an equipment identifier and a number of radio resources;
    obtaining the candidate packet set from coefficients of the hash function; and
    obtaining a pre-assigned search order from the control message.

4. The method of claim 3, wherein the step of performing the hash function comprises:
obtaining the number of radio resources from the control message by using C-RNTI or T-SMTI or MAC address as the equipment identifier.

5. The method of claim 1, wherein the step of determining the candidate packet set and the search order comprises:
obtaining a pre-assigned candidate packet set and the search order for the UE according to the control message.

6. The method of claim 1, wherein the step of determining the candidate packet set and the search order comprises:
setting the candidate packet set as all of radio resources in the first sub-frame; and
setting the search order as a sequential search order in the candidate packet set.

7. The method of claim 1, the method further comprising:
obtaining the belonging data packet by performing a CRC check on each packet in the candidate packet set; and
if the belonging data packet is found, replying the base station with an ACK message.

8. The method of claim 1, wherein the method further comprises:
sending a NACK message to the base station if the belonging data packet is not successfully decoded; and
receiving a re-transmission of the packet from the base station.

9. The method of claim 1, wherein the control message comprises:
a search algorithm for obtaining the candidate packet set; and
the search order for the data packet.

10. The method of claim 1, wherein the control message comprises:
a pre-assigned candidate packet set; and
the search order for the data packet.

11. The method of claim 1, wherein the control message comprises:
a number of data packets in the second sub-frame;
a size of one data packet in the second sub-frame;
a modulation and a coding scheme (MCS) for each data packet;
at least one corresponding hybrid (HARQ) ID of the UE; and
at least one corresponding HARQ resources in a physical uplink control channel.

12. A user equipment (UE) comprising:
a transceiver, configured to transmit and receive wireless signals; and
a processor, coupled to the transceiver, configured to
receive a control message in a first sub-frame from a base station to process a second sub-frame followed by the control message;
receive from the base station a second sub-frame of data;
decode the second sub-frame of data according to the control message; and
obtain a belonging data packet from the decoded sub-frame according to a candidate packet set and a search order, wherein the processor configured to obtain the belonging data packet from the decoded sub-frame is configured to:
determine the candidate packet set and the search order based on the control message;
search the candidate packet set according to the search order; and
obtain the belonging data packet from the searched candidate packet set.

13. The UE of claim 12, wherein the control message in the first sub-frame is a RRC message.

14. The UE of claim 12, wherein the processor configured to determine the candidate packet set and the search order is configured to:
perform a hash function based on an equipment identifier and a number of radio resources;
obtain the candidate packet set from coefficients of the hash function; and
obtain a pre-assigned search order from the control message.

15. The UE of claim 14, wherein the processor configured to perform the hash function is configured to:
obtain the number of radio resources from the control message by using C-RNTI or T-SMTI or MAC address as the equipment identifier.

16. The UE of claim 12, wherein the processor configured to determine the candidate packet set and the search order is configured to:
obtain a pre-assigned candidate packet set and the search order for the UE according to the control message.

17. The UE of claim 12, wherein the processor is configured to:
obtain the belonging data packet by performing a CRC check on each packet in the candidate packet set; and
if the belonging data packet is found, replying the base station with an ACK message.

18. The UE of claim 12, wherein the processor is further configured to:
sending a NACK message to the base station if the belonging data packet is not successfully decoded; and
receiving a re-transmission of the packet from the base station.

19. The UE of claim 12, wherein the control message comprises:
a search algorithm for obtaining the candidate packet set; and
the search order for the data packet.

20. The UE of claim 12, wherein the control message comprises:
a pre-assigned candidate packet set; and
the search order for the data packet.

21. The UE of claim 12, wherein the control message comprises:
a number of packets in the second sub-frame;
a size of one data packet in the second sub-frame;
a modulation and a coding scheme (MCS) for each data packet;
at least one corresponding hybrid (HARQ) ID of the UE; and
at least one corresponding HARQ resources in a physical uplink control channel.

22. A base station, comprising:
a transceiver, configured to transmit and receive wireless signals to at least one user equipment (UE); and
a processor, coupled to the transceiver, configured to:
transmit through the transceiver a control message to the at least one UE in a first sub-frame to request each UE to receive a second sub-frame of data followed by the control message;
encode the second sub-frame of data comprising at least one data packet according to a candidate packet set and a search order; and transmit to the UE the encoded sub-frame of data, wherein the processor configured to encode the second sub-frame of data is configured to set the candidate packet set and the search order in the control message.

23. The base station of claim 22, wherein the control message in the first sub-frame is a RRC message.

24. The base station of claim 22, wherein the processor configured to set the candidate packet set and the search order is configured to:
   perform a hash function based on an equipment identifier and a number of radio resources;
   obtain the candidate packet set from coefficients of the hash function; and
   designate a pre-assigned search order.

25. The base station of claim 24, wherein the processor configured to perform the hash function is configured to:
   set the number of radio resources in the control message by using C-RNTI or T-SMTI or MAC address as the equipment identifier.

26. The base station of claim 22, wherein the processor configured to set the candidate packet set and the search order is configured to:
   set a pre-assigned candidate packet set and the search order according to the control message.

27. The base station of claim 22, wherein the processor is further configured to:
   encode the at least one data packet with a CRC code.

28. The base station of claim 22, wherein the processor is further configured to:
   receive an ACK message from the UE if the at least one data packet is found by the UE;
   receive a NACK message from the UE if the second sub-frame is not successfully decoded by the UE; and
   send a re-transmission of the data packet to the UE.

29. The base station of claim 22, wherein the control message comprises:
   a search algorithm for obtaining the candidate packet set; and
   the search order for the data packet.

30. The base station of claim 22, wherein the control message comprises:
   a pre-assigned candidate packet set; and
   the search order for the data packet.

31. The base station of claim 22, wherein the control message comprises:
   a number of data packets in the second sub-frame;
   a size of one data packet in the second sub-frame;
   a modulation and a coding scheme (MCS) for each data packet;
   at least one corresponding hybrid (HARQ) ID of the UE; and
   at least one corresponding HARQ resources in a physical uplink control channel.

* * * * *